US005565739A

United States Patent [19]

Brownell

[11] Patent Number: 5,565,739
[45] Date of Patent: *Oct. 15, 1996

[54] POWER SUPPLY WITH THE MAIN INVENTIVE CONCEPT OF PERIODICALLY DRAWING POWER FROM A DC SOURCE

[75] Inventor: Greg A. Brownell, South Bend, Ind.

[73] Assignee: SEG Corporations, Mishawaka, Ind.

[*] Notice: The term of this patent shall not extend beyond the expiration date of Pat. No. 5,293,098.

[21] Appl. No.: 207,268

[22] Filed: Mar. 7, 1994

Related U.S. Application Data

[63] Continuation-in-part of Ser. No. 846,251, Feb. 26, 1992, Pat. No. 5,293,098.

[51] Int. Cl.$^6$ .................................................. H05B 37/02
[52] U.S. Cl. .................. 315/169.3; 315/219; 315/244
[58] Field of Search ............................. 315/169.3, 219, 315/307, DIG. 7, 244

[56] References Cited

U.S. PATENT DOCUMENTS

| | | | |
|---|---|---|---|
| 4,617,195 | 10/1986 | Mental | 427/66 |
| 4,626,742 | 12/1986 | Mental | 313/503 |
| 4,752,717 | 6/1988 | Mental | 315/511 |
| 4,982,314 | 1/1991 | Miki | 315/169.3 |
| 4,999,936 | 3/1991 | Calamia et al. | 40/544 |
| 5,066,893 | 11/1991 | Osada et al. | 315/169.3 |
| 5,142,388 | 8/1992 | Watanabe et al. | 359/50 |
| 5,144,203 | 9/1992 | Fujita et al. | 315/169.3 |
| 5,293,098 | 3/1994 | Brownell | 315/169.3 |

Primary Examiner—Robert Pascal
Assistant Examiner—Michael Shingleton
Attorney, Agent, or Firm—Barnes & Thornburg

[57] ABSTRACT

A power supply periodically draws power from a DC soure. The power supply includes an electroluminescent lamp and an inverter used to convert the DC into a sinusoidal voltage that is applied to the lamp.

19 Claims, 8 Drawing Sheets

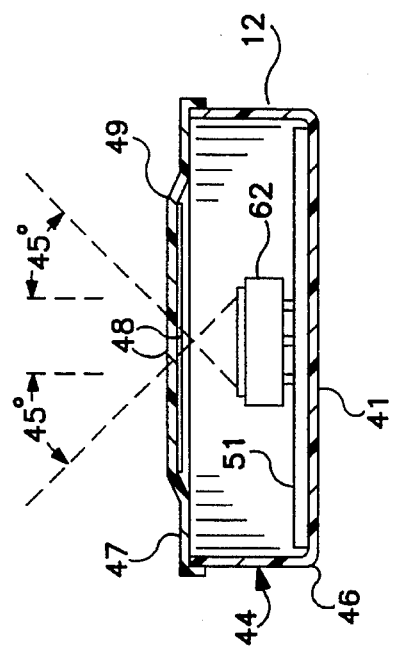
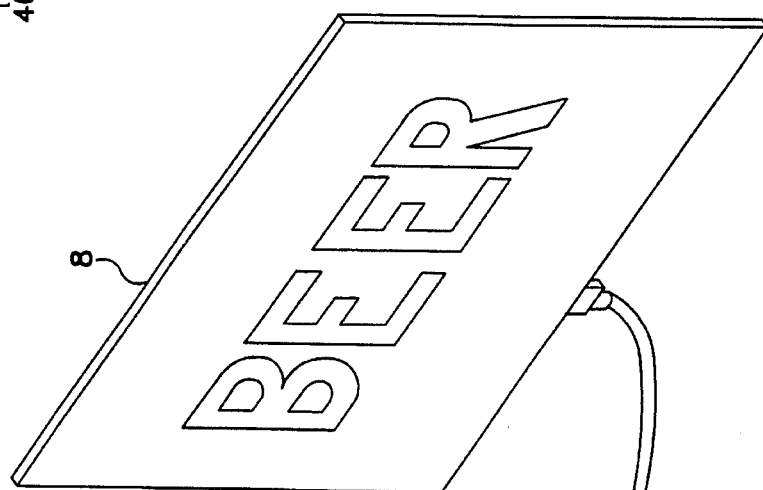
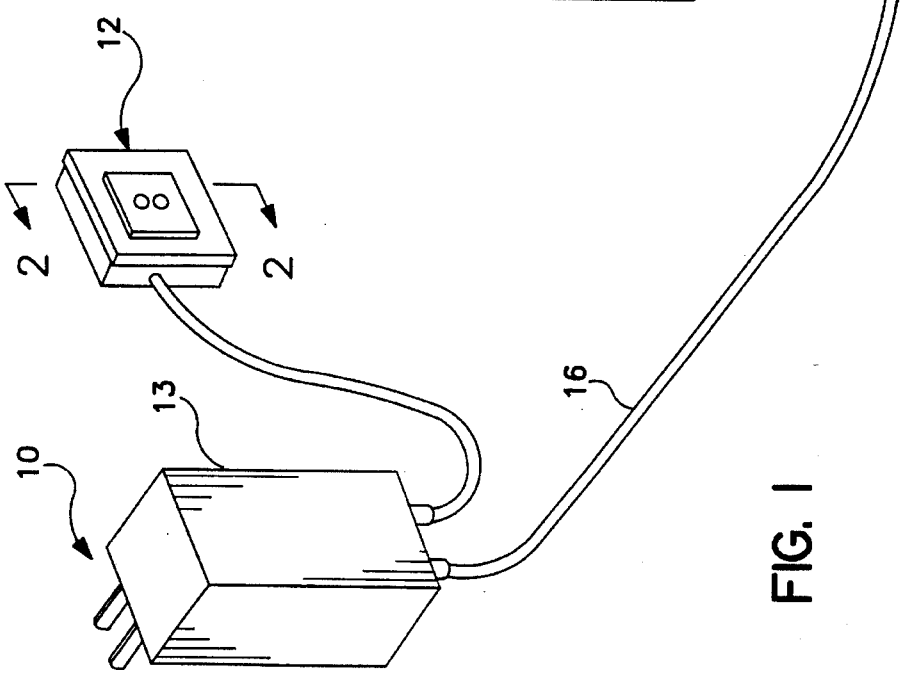
FIG. 2
FIG. 1

POWER SUPPLY WITH THE MAIN INVENTIVE CONCEPT OF PERIODICALLY DRAWING POWER FROM A DC SOURCE

This is a continuation-in-part application of U.S. Ser. No. 07/846,251 filed Feb. 26, 1992, U.S. Pat. No. 5,293,098.

FIELD OF THE INVENTION

This invention relates to a power supply and has specific reference to a power supply for an electroluminescent lamp.

BACKGROUND OF THE INVENTION

In recent years, electroluminescent (E.L.) lamps have gained popularity as a relatively inexpensive and attractive advertising display. E.L. lamps typically include an insulative material, electroluminescent materials, shielding material, and an electrically conductive material deposited in multiple layers to form an integral lamp. Such a lamp is illustrated in U.S. Pats. No. 4,617,195; 4,626,742; and 4,752,717. E.L. lamps require an AC voltage of typically 120 volts at an increased frequency, typically between 300 Hz and 3000 Hz. Further, E.L. lamps have shortened lives as voltage or current increase.

Currently, E.L. lamps are powered by a power supply generating a quasi-sine wave-AC signal at the increased frequency. Such supplies typically do not yield a true or pure AC voltage and, therefore, the life of the lamp is shortened. Further, the E.L. lamps are capacitive in nature. Current power supplies are "matched" only to the capacitive value of the lamp when new or at an average capacitive value. Matching the capacitive load (E.L. lamp) to the load is highly desired to increase efficiency of the power supply and reduce overheating problems. Through use the capacitive value of the E.L. lamp changes. Therefore, as the lamp ages and its capacitance changes the lamp and power supply become "unmatched" which decreases the efficiency of the power supply. Further an unmatched relationship between the power supply and the lamp causes the lamp to illuminate less.

Finally, current Dower supplies for E.L. lamps can either be turned on or off. When the power supply is turned on, a constant AC voltage is supplied to the lamp whether or not there is anyone in the vicinity of the lamp to view it. This also minimizes the useful life of the lamp whose purpose is to act as an attractant. Current power supplies also do not have the capability to illuminate separate segments of a multi-segment E.L. lamp.

SUMMARY OF THE INVENTION

The power supply of this invention eliminates the problems described above by providing a power supply for an electroluminescent lamp which produces a true or pure AC voltage of 115 v at an approximate 2000 Hz frequency. The power supply uses an inverter to convert a D.C. voltage into the voltage required at the frequency required to power the lamp. The inverter is inductive in nature forming a self oscillating tank circuit with the lamp. Therefore, as the capacitance value of the lamp changes over use, the change in the lamp's capacitance cause the frequency output of the inverter to change, increasing the current. The frequency change in the inverter output compensates for the age of the lamp to allow the lamp to illuminate at a relatively constant brightness over extended use.

Timers are included which flash the lamp at a predetermined rate to reduce the on time of the lamp and to assist the attractant qualities of the lamp. Further, the power supply of this invention includes as an option a small package motion sensor, which activates the power supply when motion is detected. Therefore, the lamp will be illuminated only when a person in viewing distance of the lamp activates the sensor through their body motion. An alternative embodiment of the invention uses a multiple segment driver and controller to independently turn on and off each segment of a multiple segment light in a predetermined programmable pattern.

A water activated switch circuit of the present invention can be used to provide direct current battery power to several devices, including the inverter of the present invention. The water activated switch circuit consumes little or no power from the battery until water-sensitive contacts of the circuit are immersed in water and the circuit activated.

Accordingly, an object of this invention is to provide for a novel power supply for an electroluminescent lamp.

Another object of this invention is to provide for a power supply for an electroluminescent lamp having a novel voltage inverter.

Still another object of this invention is to provide for an E.L. power supply having a small package motion sensor for limiting illumination of the lamp to when motion is detected in the vicinity of the lamp.

Still another object of this invention is to provide for a power supply for a multiple segment electroluminescent lamp.

Other objects will become apparent upon a reading of the following description taken with the accompanying drawings.

DESCRIPTION OF THE DRAWINGS

FIG. 1 is a perspective view of the power supply and sensor of this invention connected to an electroluminescent lamp.

FIG. 2 is a cross-sectional view taken along line 2—2 of FIG. 1.

DESCRIPTION OF THE PREFERRED EMBODIMENT

Figure 3:
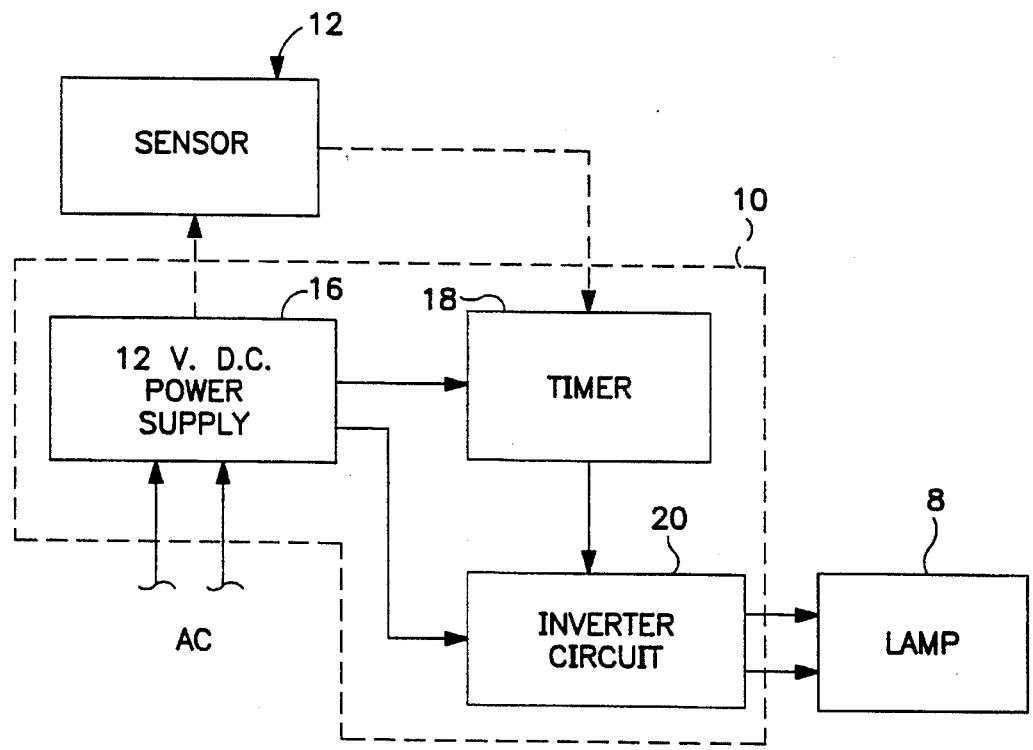
FIG. 3 is a block diagram of the power supply and sensor of this invention.

The preferred embodiments herein disclosed are not intended to be exhaustive or to limit the application to the precise forms disclosed. Rather, they are chosen and described so that others skilled in the art can utilize their teachings.

The power supply 10 and sensor 12 of this invention are illustrated in perspective form in FIG. 1 and are shown in association with electroluminescent lamp 8. Power supply 10 is contained within a sealed housing 13 and has a pair of prongs 14 extending outwardly therefrom for fit within a common electrical socket. Power supply 10 is connected by an insulated cable 16 to lamp 8. Cable 16 and lamp 8 each carry a connector part for cooperating fit with one or another to removably connect the lamp and power supply. In use, power supply 10 is plugged into a common wall outlet (not shown) and lamp 8 mounted to a supporting surface such as a wall or mirror, also not shown. When power supply 10 is turned on, lamp 8 is illuminated. Sensor 12 may be attached to power supply 10 as an option to control the output voltage from the power supply. A supply voltage for sensor 12 is provided by the power supply. The sensor is adapted for mounting on a vertical surface such that as a user passes in front of the sensor, the sensor activates power supply 10 to illuminate lamp 8 for a predetermined period of time.

BLOCK DIAGRAM

The power supply 10 of this invention is illustrated in block diagram form in FIG. 3. Power supply 10 as illustrated includes a 12 v DC power supply 16, having an input connected to a common 120 v, 60 Hz voltage source (not shown). The 12 v DC power supply 16 provides a positive DC voltage to a timer circuit 18 and inverter circuit 20 of power supply 10. Timer circuit 18 has an output connected to an input of inverter circuit 20. The output in inverter 20 is connected to lamp 8. Sensor 12 is optionally connected to the DC power supply 16 and has its output connected to an input of timer 18.

In basic operation, power supply 10 of FIG. 3 functions to provide an approximately 115 v 2000 Hz sinusoidal wave to electroluminescent lamp 8 in the following manner. With the power supply 10 connected to a 120 v, 60 Hz source, DC power supply 16 converts the AC voltage into a positive DC voltage which supplies operating voltage to sensor 12, timer 18 and inverter circuit 20. Inverter circuit 20 converts the 12 v DC regulated voltage from power supply 16 into the 115 v 2000 Hz output voltage required for efficient long life operation of the lamp 8. Timer 18 is connected to the inverter circuit to enable the output of the inverter circuit to illuminate the lamp on a predetermined timed basis so that the lamp illuminates in a flashing or strobe like manner. Sensor 12 connected as an option to power supply 10 functions to inhibit inverter circuit 20 by activating timer only when motion is detected near sensor 12. Timer 18 enables inverter circuit 20 for a predetermined period of time after activated by sensor 12. After "time out," timer 18 disables the inverter 20. Sensor 12 is activated by detecting motion within its field of view. The sensor associated with the power supply limits the illumination time of the lamp 8 to periods when customers are within close proximity to the sensor. This feature further increases the lamp's life.

POWER SUPPLY SCHEMATIC

Figure 4:
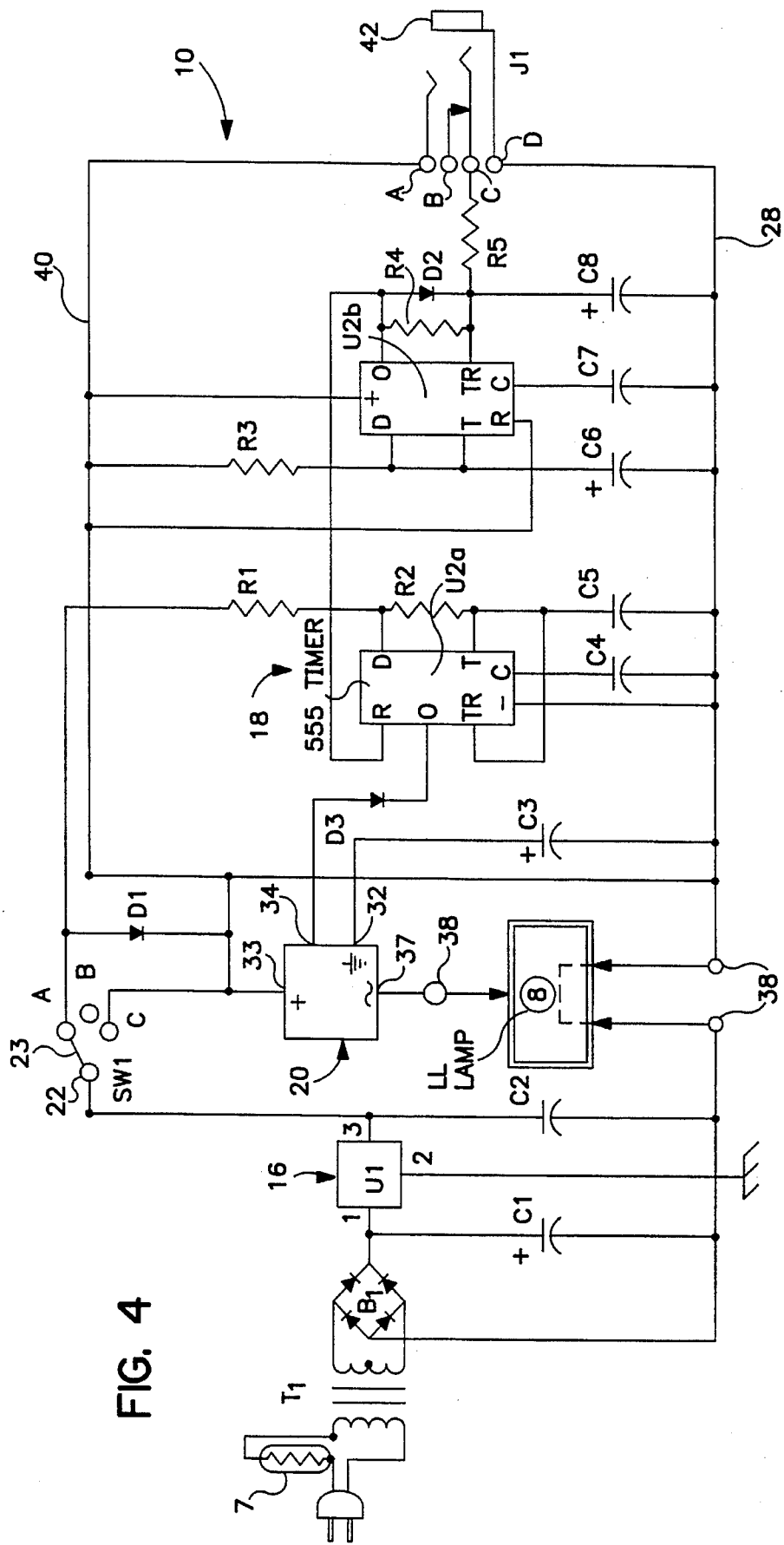
FIG. 4 is a schematic representation of the power supply of the invention.

FIG. 4 illustrates the power supply 10 of FIGS. 1 and 3 in a schematic form. Power supply 10 as illustrated includes a transformer T1 connected at its primary winding to a common male plug for connection to an AC voltage source (not shown). A thermal fuse TF1 is operatively associated with the core of the transformer and connected in series with the primary coil of the transformer to provide thermal overheating protection for the unit. Transformer T1 is step down transformer and provides, in the preferred embodiment, approximately 14 v AC at the output of its secondary winding. The secondary winding of transformer T1 is connected to a full wave bridge rectifier B1. An electrolytic filter capacitor C1 is connected across the output of bridge B1 to filter the rectified output voltage from the bridge. The filtered fullwave DC output voltage of bridge B1 is connected to the input lead 1 of a voltage regulator U1. Voltage regulator U1 in the preferred embodiment provides a positive 12 v DC voltage at its output lead 3. The ground lead 2 of U1 is connected to the negative bridge output or ground lead. The regulated positive 12 v DC voltage from U1 is connected to terminal 22 of switch SW1. A filter capacitor C2 is connected from the output lead 3 of regulator U1 to ground lead 2. Switch S1 in the preferred embodiment illustrated is a single pole switch having switch contacts A, B and C selectively connected to terminal 22 by switch arm 23. Contact C of switch S1 is connected to the DC input 33 of the inverter 20, shown in block form. A diode D1 is connected between the A and C terminals of switch SW1. A capacitor C3 is connected between ground potential at bus 28 and the DC input 33 of inverter 20.

Inverter 20 explained in detail below includes a DC voltage input lead 33, a ground lead 32, an inhibit lead 34 and an AC output 37. As illustrated, ground lead 32 is connected to ground bus 28, inhibit lead 34 is connected through diode D3 to timer circuit 18, AC output 37 is connected through a socket 38 to E.L. lamp 8. It should be noted that DC ground bus 28 is connected by socket 38 through lamp 8 so that if lamp 8 is disconnected from the power supply the ground path is broken and power is disrupted from the bridge to the inverter and timer circuits as a safety precaution.

Timer circuit 18 includes dual 555 timers U2a, U2b connected between a positive voltage bus 40 and ground bus 28. Resistor R1 is connected between SW1-a and the discharge lead (D) of timer U2a. A resistor R2 is connected between the discharge lead (D) and threshold lead (T) of U2a. A capacitor C5 is connected between the threshold lead (T) and ground bus 28. A capacitor C4 is connected between the control lead (C) of U2a and ground bus 28. The trigger lead (TR) of U2a is connected to the threshold lead (T). A diode D3 is connected as illustrated between the output of U2a and the inhibit lead 34 of inverter 20. The reset lead (R) of U2a is connected to the output lead (O) of U2b. A resistor R3 and capacitor C6 are connected in series between bus 40 and ground bus 28. The junction of resistor R3 and capacitor C6 is connected to the discharge lead (D) and threshold (T) lead of U2b. The reset lead (R) of U2b is connected to positive voltage bus 40. A resistor R4 and diode D2 are connected in parallel between the output lead (O) and trigger lead (TR) of U2b. A capacitor C7 is connected between the control lead (C) and ground bus 28. A capacitor C8 is connected between the trigger lead (TR) and ground bus 28.

An input jack 42 is carried by housing 13 of power supply 10. Jack 42 is connected as described below for optional connection of sensor 12 to power supply 10. Terminal A of connector 42 is connected to the positive voltage bus 40 and terminal D is connected to the ground bus 28. A resistor R5 is connected between terminal C and the trigger lead (TR) of U2b. Terminal B is unconnected.

In operation the power supply of FIG. 4 functions as follows to supply a 2 kHz, 115 v AC sine wave to lamp 8. Initially, with the power supply plugged into an electrical wall outlet and arm 23 of switch SW1 connecting contact B to terminal 22, no voltage is supplied to either inverter 20 or the timer circuit 18. This is referred to as the off position for switch SW1. When arm 23 of switch SW1 is shifted to connect contact A and terminal 22 the 12 v DC output from U1 is connected through diode D1 to the positive voltage input 33 of inverter 20 and to the positive voltage bus 40 supplying voltage to U2a and U2b. The DC voltage is also connected to resistors R1, R2 to begin the charge C5. Timer U2a and U2b are two astable oscillators. U2a has a 1 Hz cycle rate and U2b has a 20 second cycle time. R3 and C6 determine the "on" time for the output of U2b which in the preferred embodiment is approximately 3 seconds. Resistor R4 and capacitor C8 determine the "off" time for the output of U2b which in the preferred embodiment is 10 seconds. When the output voltage at pin O of U2b is "on" or high, U2a is enabled by the high voltage at the reset pin R of U2a. Enabling U2a allows its output to cycle at its 1 Hz rate. The output of U2a is connected through diode D3 to the enable input 34 of inverter 20. When the voltage at the enable pin 34 of the inverter is high, the inverter supplies the 115 v 2 kHz signal to lamp 8. When the output of U2b is "off" or low, inverter 20 is disabled. Therefore, with arm 23 of SW1 connected to the A terminal, both timers work in conjunction with the power supply 10 to flash lamp 8 at a 1 Hz rate for 3 seconds during a 13 second cycle.

If arm 23 of SW1 is shifted to connect terminal 22 to terminal C, the DC voltage from U1 is connected to inverter 20 and placed on bus line 40. It should be noted that resistor R1 is not connected to the positive DC voltage with SW1 in this position due to D1. In this configuration, U2b operates as previously described, but without voltage to R1, R2 and C5, U2a is unable to complete its timing cycle. Therefore, the output voltage from U2a follows the output voltage from U2b and lamp 8 is illuminated for 3 seconds and off for 10 in a continuous 13 second cycle. It should be understood that the cycle times of U2a and U2b may be varied by changing the capacitor and resistor valves in a manner consistent with the industry.

If sensor 12 is connected to input jack 42, continuous operation of timer U2b is prevented. U2a cycles once when triggered by sensor 12 which outputs a low voltage when motion is detected. After triggered, timers U2a and U2b operate as previously described dependent on the position of switch SW1. The specific circuitry involved for sensor 12 is common in the industry and not considered to be a novel part of this invention.

When arm 23 of switch SW1 is shifted to connect contact A with terminal 22, DC voltage is supplied to timer circuit 18 and to inverter 20 through diode D1. With voltage supplied to timers U2a and U2b, the output of U2b is high and capacitor C6 begins to charge. When C6 charges to approximately two thirds the DC supply voltage on bus 40, the output of U2b switches low. A low at the output lead (O) of U2b allows capacitor C8 to slowly discharge through resistor R4. The discharge lead (D) goes low which discharges capacitor C6. When capacitor C8 falls below approximately one third the supply voltage, the output 37 at timer U2b switches high and causes capacitor C6 to charge through R3 until C6 reaches a threshold voltage (two thirds of the supply voltage) which completes the timing cycle. Therefore, it can be seen that resistor R3 and capacitor C6 determine the "on" time of U2b output and resistor R4 and capacitor C8 determine the "off" time of the switch. The output lead (O) of U2b is connected to the reset lead (R) of timer U2a. A high voltage on the reset lead (R) of either U2a or U2b enables the timers function.

Therefore, when the output of U2b is high, the output of U2a is enabled. When timer U2a is enabled, its output is turned on and off at a rate determined by R1, R2 and C5. In the preferred embodiment, timer U2a has a 1 Hz cycle rate having a one half second "on" time and one half second "off" time.

When switch SW1 is connected to contact A, timers U2a and U2b are both activated in accordance with the above description. The resultant output from timer U2a flashes or is cycled on three times during a three second period and is off for a ten second period. It should be understood that the actual on and off times of the timer cycles may be varied in keeping with common timer practice.

If arm 23 of switch SW1 is connected between contact C and terminal 22, voltage is supplied to inverter 20 and timer circuit 18 consistent with the previous description. However, it should be noted that, as illustrated, since resistor R1 is connected at one end to contact C of switch SW1 and the anode of diode D1, when switch SW1 is positioned with the arm 23 connection, the positive DC voltage is not supplied to resistor R1 and timer U2a cannot complete its timing cycle.

SINE WAVE INVERTER

Figure 5:
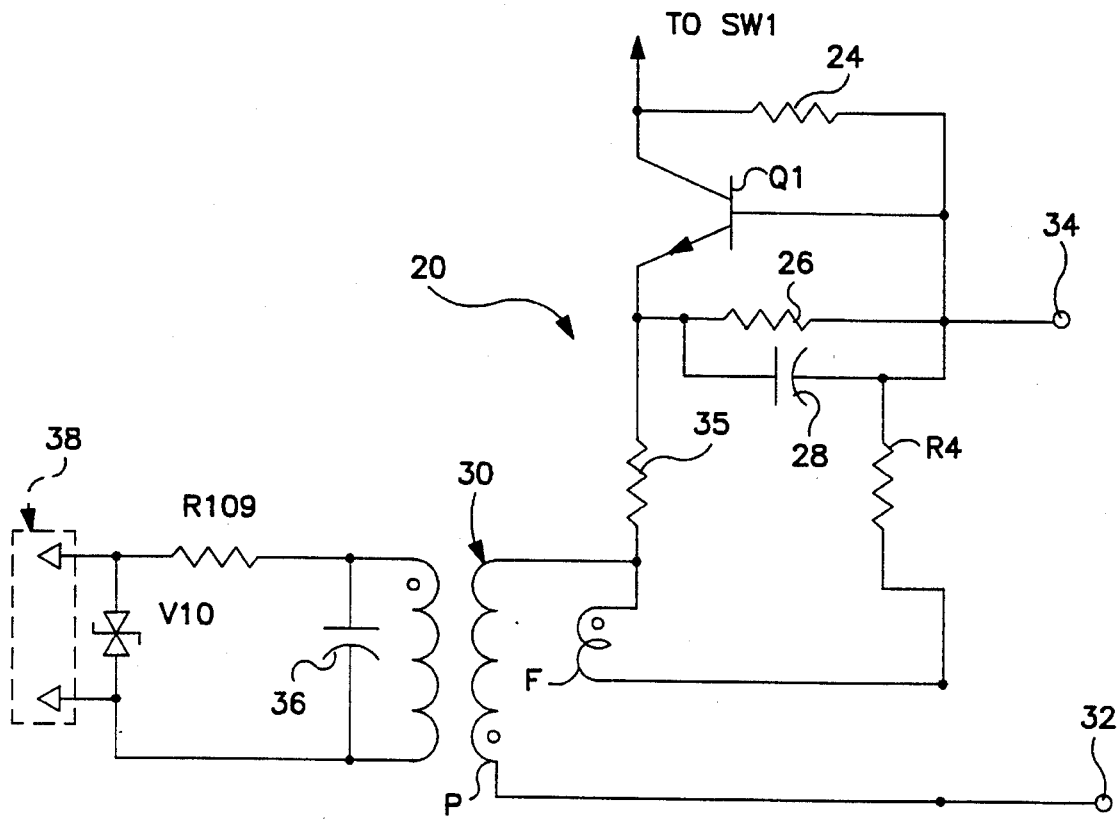
FIG. 5 is a schematic representation of the inverter circuit of this invention.

FIG. 5 illustrates in schematical form the sine wave inverter 20 for the present invention. Inverter 20 includes an NPN transistor Q1 having its collector lead connected to switch SW1 (see FIG. 4). A resistor 24 is connected between the collector lead and base lead of transistor Q1. A parallel RC circuit being a resistor 26 and capacitor 28 are connected between the emitter lead and base lead of transistor Q1. This parallel RC network is used to filter any high frequency noise from the base drive signal. Transformer 30 includes a primary winding P connected between ground and resistor 35. The primary winding further includes a feedback winding used to provide the base drive signal for the transistor to sustain the oscillations of the inverter. The other end of resistor 35 is connected to the emitter lead of transistor Q1. Resistor R4 is connected between the base lead of transistor Q1 and the feedback winding F of T1. Capacitor 36 is connected across secondary winding S. Varistor V10 is connected across socket 38. Resistor R109 is connected between secondary winding S and varistor V10. Resistor R109 and varistor V10 are used to limit the output spark energy to a value below ignition levels in hazardous environments. If the output open circuits, the peak voltage is clamped by V10, while the current through V10 is limited by R109. The short circuit current due to the stored inductive energy of transformer 30 is also limited by R109, while the peak voltage is also limited by V10.

Lamp 8 and transformer 30 form a resonant circuit such that the secondary voltage of transformer 30 is at its maximum. Transformer 30 also provides a voltage step up required by the lamp.

Capacitor 36 performs a sine-shaping function by preloading the oscillator at the secondary of transformer 30, thereby limiting the open circuit voltage and reducing the tendency of the transformer 30 to saturate. E.L. lamp 8 is essentially a light-emitting capacitor constructed of a conductive transparent overlay, a phosphor layer, insulating (dielectric) layer, and a conductive rear electrode. When an AC field is applied across the electrodes, the phosphor layer lights up. This "cold" light source differs from incandescent lighting in that the light emitted is not due to the temperature of the source.

The high voltage, high-frequency power required by the E.L. lamp is produced by the DC to AC inverter whose output is a sine wave of approximately 120 volts at the desired frequency. A frequency range of 700 Hertz to 5,000 Hertz is provided by preferred embodiments of the inverter. In addition, alternative embodiments of the inverter provide a sine wave output that ranges from 80 volts to 230 volts. This output voltage range is available by adjusting various characteristics of the inverter such as the turns ratio between the primary winding P and the second winding S. Since the E.L. lamp is capacitive, the applied sine wave voltage causes the lamp to draw a sinusoidal current nearly 90 degrees out of phase with the voltage; therefore, little real power is consumed by the lamp, except for losses caused by a less than perfect dielectric material and inherent resistance in the conductive electrodes.

The power inverter is a self-oscillating, resonating circuit formed by matching the impedance of the transformer 30 output to the particular lamp used, at the desired frequency. The sine wave output is a result of the resonant mode of the circuit which avoids magnetic saturation of transformer's core. This results in maximum power transfer between the circuit and the lamp and minimum radio frequency interference caused by the harmonic content of a non-sinusoidal waveform.

As the E.L. lamp degrades with age, its capacitance tends to decrease, therefore, its impedance increases and consequently the inverter output frequency and voltage will increase. By matching the inverter and impedance of a lamp which is near the end of its life, a degree of brightness compensation is obtained that will raise the output power as the lamp ages and the phosphor becomes weaker. Thus, the circuit is initially out of resonance and slowly drifts toward the resonant point with time.

Figure 8:
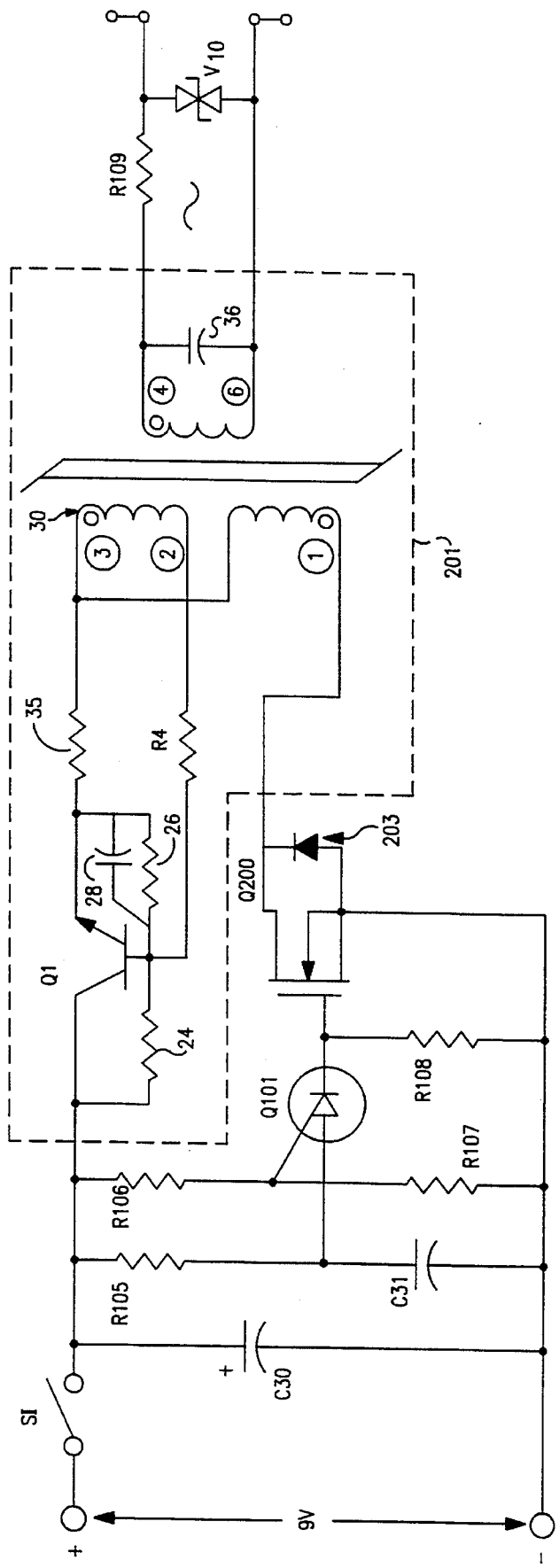
FIG. 8 is a schematic representation of the inverter modified for use in a battery powered flasher.

In an alternative embodiment, the sine wave inverter is modified for use in a battery-powered flasher application as illustrated in FIG. 8. Here, the inverter is ideally suited to the low duty-cycle (percentage of "on" time) required for long life with a transistor battery of the following reasons.

Each AC cycle applied to the E.L. lamp produces a finite quantity of photons (light particles). The human eye responds to the time-weighted average (TWA) of the light quantity emitted, that is the longer the flash duration, the higher the perceived brightness. Therefore, the more AC cycles that can be generated within a given time period, the brighter the lamp will appear. The high frequency produced by this inverter (typically 2.4 kHz) allows flash durations of 10–15 milliseconds while providing 25 or more AC cycles for each flash. The resulting duty cycle can be less than 2% at 80 flashes per minute, producing 50 times longer operating time than with continuous illumination. Also, the flashing circuit consumes virtually no power between flashes, so battery life depends only upon the duty cycle of the inverter operation. Finally, the high frequency inverter operation allows a smaller size and weight transformer than lower frequencies, increasing portability.

Switch S1 of this sine wave inverter is a magnetically-activated reed switch connected between the circuit and the nine volt battery (not shown) and contained in the unit construction. A nine volt DC input from the battery is supplied to the circuit. Capacitor C30 is connected across the DC input functioning as an input filter to block switching transients caused by S1 contact bounce, and helps stabilize the supply voltage. Resistor R105 and capacitor C31 are connected in series across the DC input. C31 is the timing capacitor which in conjunction with resistor R105 sets the flash rate (interval). The junction of resistor R105 and capacitor C31 is connected to the anode lead of the unijunction transistor Q101.

Resistors R106 and R107 are connected in series across the DC input with their junction being connected to the gate lead of the unijunction transistor Q101. R106 and R107 set the programmable parameters of Q101 and its switching threshold. The cathode of the unijunction transistor lead is connected to the gate lead of MOSFET Q200. Resistor R108 is connected between the gate lead and source lead of MOSFET Q200. The source lead is also connected to the negative input line of the nine volt DC supply.

The area inside the broken lines 201 represents the sine wave inverter portion of the schematic and is identical to the previous description thereof. Resistor R109 is connected between the transformer (30) secondary (output) and metal-oxide varistor V10. R109 serves to limit the short-circuit output current. Although the inverter shuts down when short circuited, the inductive energy stored in T1 can be sufficient to cause a substantial spark in a fault condition.

With no output load, the peak output voltage is significantly higher than normal. V10 clamps the peak output voltage below a predetermined value if the output circuit opens. R109 also limits the current thorough V10 to a safe level.

The combination of R109 and V10 limits the available spark energy at the output terminals as may be required in hazardous locations (i.e. UL safety standard UL913).

When switched on by an appropriate magnetic field, capacitor C30 immediately charges up to the battery voltage, V1. A small current also flows through resistor R105 and begins to charge timing capacitor C31 positively toward V1. Resistors R106 and R107 form a voltage divider that sets the trigger threshold of programmable unijunction transistor Q101.

When the voltage charge on C31 reaches about 70% of V1, Q101 switches into conduction, applying the voltage at C31 to the gate of MOSFET Q200 and resistor R108. Q200 then switches on and conducts the negative battery terminal to the negative inverter input, enabling the inverter to oscillate and supply AC power to the E.L. lamp at its output. Q200 also has an intrinsic internal anti-parallel diode 203 which conducts the negative portion of the inverter input current (T2 primary) back to the supply that is necessary to sustain oscillation. This diode does not conduct any DC battery current while Q200 is off because it is reverse biased.

C31 then begins to discharge through R108 until the current through Q101 nears zero and falls below its holding value. Q200 drops out of conduction when its gate voltage falls below the gate threshold voltage, and the inverter stops oscillating. The cycle is then repeated beginning with the charging of C31. It can be seen that by varying the values of R105, R106, R107, R108 and C31, any desired timing cycle and duty cycle can be achieved since the "on" and "off" times are independently adjustable.

MOTION SENSOR CONSTRUCTION

Sensor 12, best seen in FIG. 2, includes a circuit board 51 having an infrared (IR) dual element optical sensor 62 surface mounted to the board. The circuit board 51 and sensor 62 are carried within a housing 44 having a base 46 and lid 47. Board 51 is adjacent back wall 41 of base 46 to space sensor 62 from lid 47. Lid 47 includes two openings 48. An IR window 49 is connected to lid 47 to cover openings 48. The combination of housing 44 with openings 48 and the dual element sensor permits operation of the sensor without additional optical focal aids. The combination results in a small package sensor, approximately 1"×1"×

½" having a field of view of approximately 10 feet 45 either side of center as shown. It should be understood that the circuitry supporting sensor 62 is commonly known in the industry and is also connected to board 51. In the interest of clarity those elements are not illustrated.

PROGRAMMABLE POWER SUPPLY

Figure 6A:
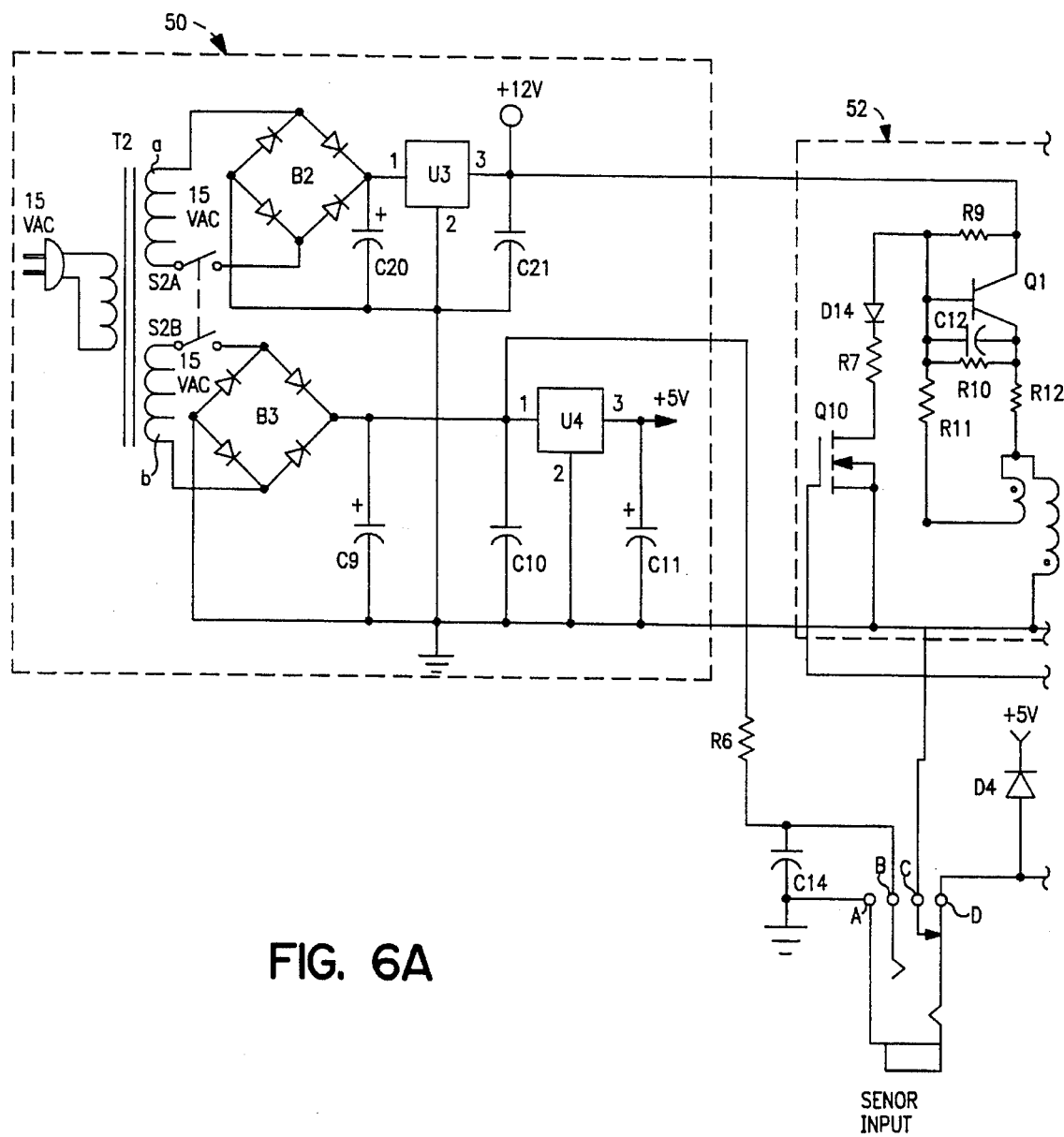
FIGS. 6A and 6B are drawings which together present is a schematic representation of the programmable power supply.
Figure 6B:
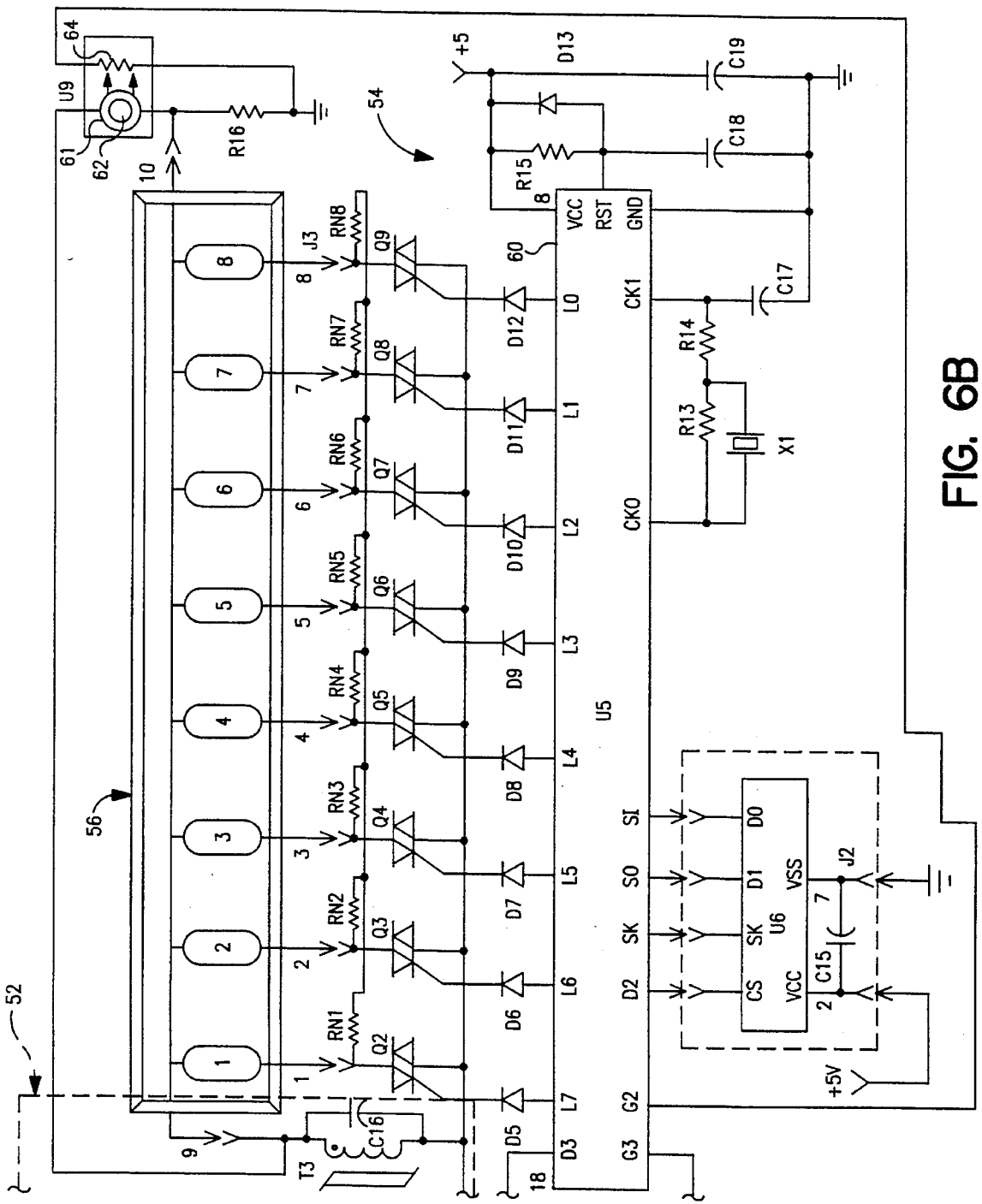

A second embodiment of the power supply of this invention is illustrated in schematic form in FIG. 6. The programmable power supply of FIG. 6 includes a DC power supply 50, an inverter 52 and a controller 54 for driving an eight segment electroluminescent lamp 56 in a predetermined sequence.

Power supply 50 includes a transformer T2 having a primary winding connected to a common male plug. A thermal fuse TF2 is placed in series between one lead of the male plug and one lead of the primary winding as illustrated. Transformer T2 includes two secondary windings a and b. Switches S2A and S2B are connected to windings a and b, respectively. A full wave bridge rectifier B2 is connected across secondary a through S2A. A filter capacitor C20 is connected across the DC output of bridge B2. A voltage regulator U3 is connected by its input to the positive DC voltage output of bridge B2. Lead 2 of U3 is connected to the negative voltage output of bridge B2. A filter capacitor C21 is connected across output lead 3 and ground lead 2 of U3. In the preferred embodiment the output voltage from U3 is positive 12 volts. A full wave bridge rectifier B3 is connected across transformer secondary b through S2B, which, in association with filter capacitors C9, C10 and C11 and voltage regulator U4 interconnected as illustrated, provide a regulated positive 5 volts.

The inverter circuit 52 is substantially similar in construction and operation as previously disclosed with reference to the inverter circuit of FIG. 5. The only difference in construction and operation of inverter 52 is the inclusion of mosfet Q10, which when turned on shunts the base of transistor Q1 to ground through resistor R7 and diode D14, thereby preventing its oscillations. Mosfet Q10 is turned on and off by controller 54 which will be described later. Inverter circuit 52 outputs a 120 VAC, 2000 Hz signal from transformer T3. One output lead of transformer T3 is connected through connector 9 to the ground plane of multisegment lamp 56. The other output lead of transformer T3 is connected to the main terminal 1 (MT1) leads of triacs Q2–Q9. The main terminal 2 (MT2) leads of triacs Q2–Q9 are connected through jacks 1–8 to lamp segments 1–8, respectively, of lamp 56.

Resistor network comprises eight (8) resistors RN1–RN8 connected from each of the eight adjacent lamp segments to a common floating pin. The E.L. lamp segments, being capacitive by nature, tend to store a DC charge after being deselected or turned off by their respective control triac. Since the current and voltage in the lamp are out of phase, and each triac turns off at near zero current, its lamp segment is left holding the instantaneous voltage appearing across it when the triac turns off. The next time the segment is selected, the residual DC voltage on the lamp is discharged at the moment of switching, resulting in high peak lamp currents that may cause dielectric failure and produce pinpoint shorts inside the lamp, as well as disrupt the control logic by creating voltage transients on the power supply feeding the inverter. The resistors RN1–8 provide a discharge path for the residual DC voltage, draining the charge into the remaining (unselected) segments, thus reducing the charge voltage remaining on any one lamp segment.

Also, since the inverter's output is load-dependent, the brightness of any one segment varies with the number of segments lit at one time, causing the display to dim as more lamp segments are illuminated. This characteristic is desirable when an inverter is used to power a single lamp load, because as the lamp ages and its phosphors deteriorate, its impedance increases and the inverter raises its output to compensate for the loss of brightness. It is not desirable when operating an 8-segment lamp display since the load changes for each combination of lit lamps over an 8:1 range. The brightness of these segments should ideally remain constant.

Resistors RN1–8 tend to equalize the load by drawing additional inverter output current through the unlit lamp segments when fewer than eight lamp segments are lit, so that the inverter output voltage does not rise substantially as fewer segments are illuminated. For example, if only one lamp segment is lit, each of the remaining segments consumes some current through its respective resistor, increasing the total current to a value that is closer to the full load current, when all segments are on simultaneously.

Figure 7:
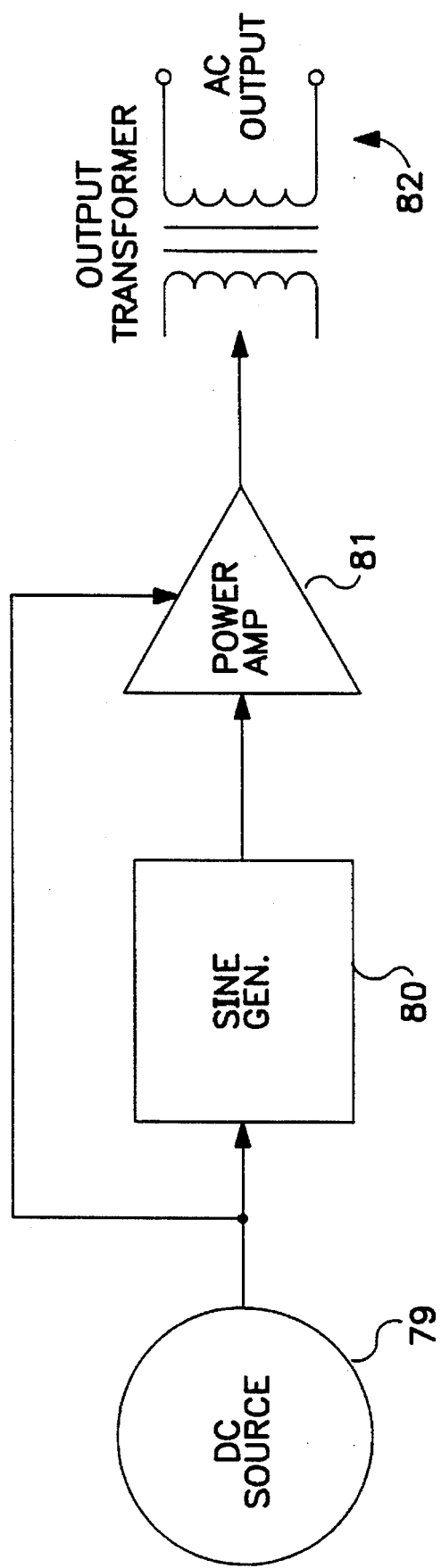
FIG. 7 is a block diagram of the power sine wave oscillator as an alternative embodiment of the inverter.

Alternatively, a power oscillator can be used in lieu of an inverter. This arrangement has the advantage with multiple-segment E.L. lamps of being less load-dependent, resulting in a more constant lamp brightness. The power sine wave oscillator depicted in FIG. 7 converts a low voltage DC source into a higher voltage AC sine wave for powering electroluminescent E.L. lamps. However, unlike the self-resonating inverter circuits previously described, the power oscillator's output frequency does not depend on the load impedance, therefore, it functions as a more stable voltage source than does an inverter when used with a variable load such as a changing number of lamp segments.

This oscillator uses DC source 79, a sine function generator 80, a power amplifier stage 81, and a voltage step-up transformer 82. In operation, the DC sources supplies voltage to the sine generator and the power amplifier 80. The sine wave generator converts the DC voltage into a signal of constant magnitude and frequency which is used to drive the amplifier so that the primary winding of the transformer receives a relatively constant drive voltage over a range of load capacitance.

Controller 54 includes a 4 bit microcontroller 60 (type No. COP422 as made by National Semiconductor) having output leads L7–LO connected to the anode leads of diodes D5–D12 respectively. The cathode leads of diodes D5–D12 are connected to the gate leads of triacs Q2–Q9. The Vcc pin 8 of microcontroller 60 is connected to the +5 v DC voltage from U4. A resistor R15 and diode D13 are connected in parallel from the +5 v voltage source to the reset (Rst) pin of microcontroller 60. A capacitor C18 is connected between the (Rst) pin and ground. A filter capacitor C19 is connected between the +5 v voltage source and ground. A pair of resistors R13 and R14 are connected in series between the clocking leads CK0 and CK1 of micro-controller 60. Crystal X1 is connected across resistor R13. A capacitor C17 is connected between CK1 pin and ground. Output pin D3 of microcontroller 60 is connected to the gate lead of mosfet Q10. Input lead G3 of microcontroller is connected to terminal B of sensor input jack. A diode D4 is connected between the +5 v source and G3 lead of microcontroller 60. Terminal B of the sensor input jack is connected to the input of voltage regulator U4 to supply a +15 volt unregulated voltage to a sensor connected to the jack. Terminal A of the, sensor input jack is connected to ground. Capacitor C14 is connected between terminals A and B of the sensor input jack. Terminal C of the sensor input jack is also connected to ground. An EEPROM U6 is included to supply program information to microcontroller 60. EEPROM U6 has its data leads A, B, C and D, connected to data input leads of E-H of microcontroller 60. The EEPROM U6 is connected to the +5 v source and ground and includes a capacitor C15 connected between the positive and ground input leads.

A neon photocoupler U9 is included and has its input lead 61 connected to an output lead of T3. A current limiting resistor is connected between the neon source 62 and ground. The resistive component 64 of U9 is connected between ground and input pin G2 of a microcontroller U5.

In operation, a control program is permanently stored within the internal ROM memory of microcontroller U5 and is executed from the beginning each time the microcontroller is turned on. The microcontroller is reset on each initial power up by capacitor C18 and resistor R15. The program within the ROM reads data stored in the EEPROM U6. The data within the EEPROM U6 provides information as to the illumination of the individual segments of lamp 56. Therefore, EEPROM U6 may be specifically programmed for a specific E.L. lamp 56 and changed with the lamp.

The microcontroller under instructions from the EEPROM gates on triacs Q2–Q9 selectively to illuminate the individual lamp segments 1–8 of lamp 56. The gating of the triacs is synchronized with a high D3 pin output to effect zero-crossing. The inverter output is forced to restart at zero volts by disabling the oscillator for a brief period prior to applying the triac gate signals. The delay period of approximately 500 microseconds is longer than one AC cycle (at the inverter frequency of 2.4 kHz), but too short to cause a perceptible flicker in the lamps when switching outputs, so the inverter is assured to be shut down, while the synchronization is transparent to the viewer. Thus, the selected triac gates are already turned on before D3 enables the inverter output so the lamps are always turned on at the AC zero crossings. This is important since the lamps are capacitive and turn-on at an uncontrolled point in the sine wave would result in large peak turn-on currents that place high stresses on the lamps and triacs, reducing lifetime and reliability. This synchronization produces soft switching of the loads, extending their life and minimizing (radio) interference caused by noisy or high switching currents.

Microcontroller U5 tests pin G2 32 times a second within one of its routines and if a logical 0 or low voltage is present immediately transfers the program to a fault routine disabling all outputs. U9 is a neon lamp which is a neon-photocell photocoupler whose input is connected across the "shunt" pins of the E.L. lamp. As long as the lamp is plugged in, there will be no voltage across U9's input and its photocell output will be in an "off" state (high impedance). If the unit is operated with the lamp unplugged, a voltage will develop across U9's input through R11, turning on the neon lamp and forcing U9's output to a low impedance state. This low output drives U3 pin G2 (16) low, flagging the controller to a fault condition which then removes all output voltages. The fault flag is tested every 1/32 of a second so no open-circuit voltage at lamp connector J3 will persist for more than 1/32 second (see software description).

Figure 9:
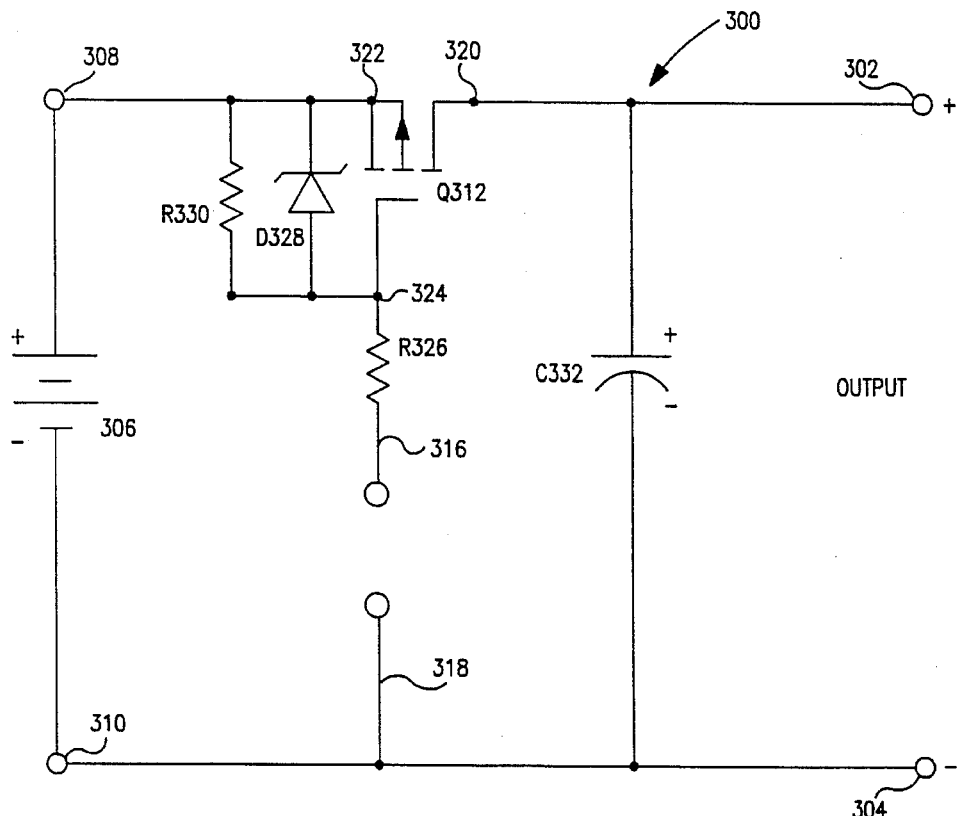
FIG. 9 is a schematic representation of a water activated switch circuit of the present invention.

FIG. 9 shows an embodiment of a water activated switch circuit 300 of the present invention. Circuit 300 can be used to control the supply of direct current power to several devices, including an inverter such as inverter circuit 20 used to power electroluminescent lamp 8. Circuit 300 causes a load connected between output terminals 302 and 304 to turn on upon contact with water. Circuit 300 consumes little or no power from battery 306, which is connected to input terminals 308 and 310, until water-sensitive contacts 316 and 318 are immersed in water and circuit 300 activated.

Circuit 300 includes a voltage controlled switch Q312 and a pair of water-sensitive contacts 316 and 318. Voltage controlled switch Q312 provides a means for electrically connecting the direct current voltage supplied by battery 306 to output terminals 302 and 304 when contacts 316 and 318 of circuit 300 are immersed in water.

As can be seen in FIG. 9, voltage controlled switch 312 includes a P-channel enhancement-mode metal oxide silicon field-effect transistor that has a drain 320 electrically connected to output terminal 302, a source 322 electrically connected to input terminal 308, and a gate 324 electrically connected to water-sensitive contact 316 through resistor R326. The substrate terminal of transistor Q312 is shown as being electrically connected to source 322. A zener diode D328 is electrically connected between source 322 and gate 324 of transistor Q312 and a resistor R330 is electrically connected in parallel with zener diode D328.

In preferred embodiments, water-sensitive contacts 316 and 318 are made from a conductive elastomeric silicone rubber. This contact material tends not to react chemically with any minerals in the water when a DC current from battery 306 is conducted through contacts 316 and 318 as do some materials. That is, contacts 316 and 318 resist electroplating. In addition, the elastomer resists tarnishing and corrosion from exposure to the elements.

In operation, when water appears across contacts 316 and 318, the gate 324 to source 322 voltage across transistor Q312 becomes negative so that transistor Q312 is switched on and power from battery 306 appears across output terminals 302 and 304. Zener diode D328 clamps the maximum gate 324 to source 322 voltage across transistor Q312 to a maximum predetermined value to protect transistor Q312 from static discharge or overvoltage. Resistor R330 helps ensure that transistor Q312 remains off by keeping the gate 324 to source 322 voltage across transistor Q312 at substantially zero volts. Resistor R326 connects water-sensitive contact 316 to gate 324 of transistor Q312.

A filter capacitor C332 is electrically connected in parallel with output terminals 302 and 304 of circuit 300. Capacitor C332 helps remove electrical noise from the output of circuit 300.

Figure 10:
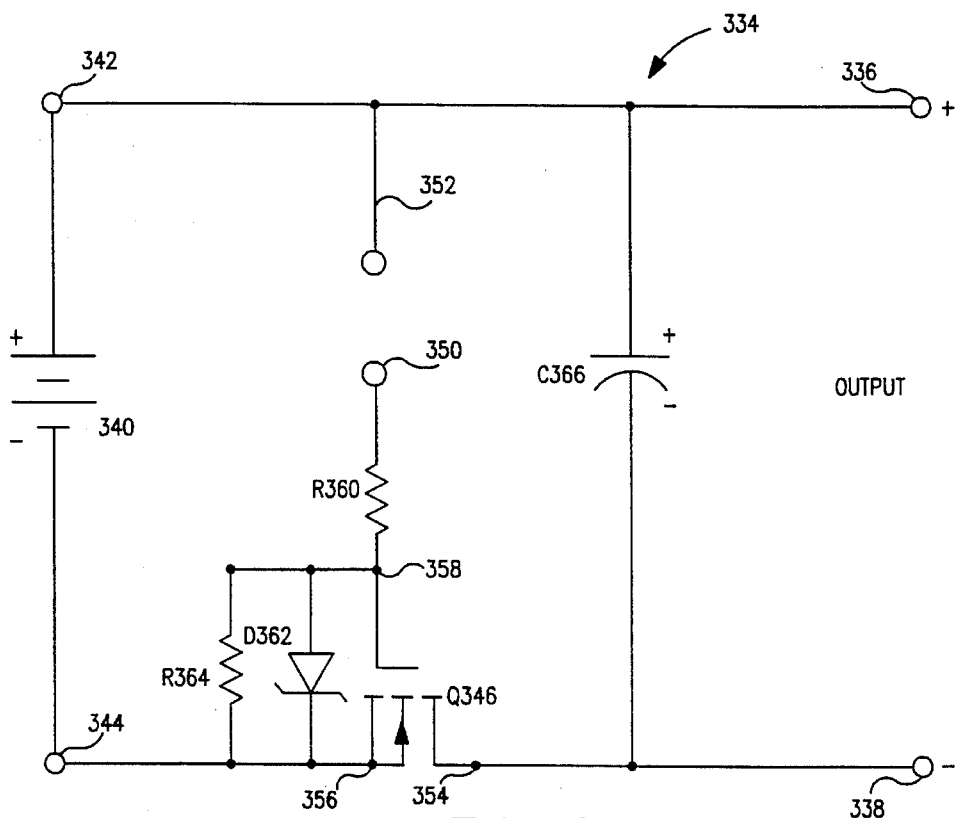
FIG. 10 is an alternate embodiment of a water activated switch circuit of the present invention.

An alternative embodiment of a water activated switch circuit 334 is shown in FIG. 10. Circuit 334 can be used to control the supply of direct current power to several devices, including an inverter such as inverter circuit 20 used to power electroluminescent lamp 8. Circuit 334 causes a load connected between output terminals 336 and 338 to turn on upon contact with water. Circuit 334 consumes little or no power from battery 340, which is connected to input terminals 342 and 344, until water sensitive contacts 350 and 352 are immersed in water and circuit 334 activated.

Circuit 334 includes a voltage controlled switch Q346 and a pair of water-sensitive contacts 350 and 352. Voltage controlled switch Q346 provides a means for electrically connecting the direct current voltage supplied by battery 340 to output terminals 336 and 338 when contacts 350 and 352 of circuit 334 are immersed in water.

As can be seen in FIG. 10, voltage controlled switch Q346 includes a N-channel enhancement-mode metal oxide silicon field-effect transistor that has a drain 354 electrically connected to output terminal 338, a source 356 electrically connected to input terminal 344, and a gate 358 electrically connected to water-sensitive contact 350 through resistor R360. The substrate terminal of transistor Q346 is shown as being electrically connected to source 356. A zener diode D362 is electrically connected between source 356 and gate 358 of transistor Q346 and a resistor R364 is electrically connected in parallel with zener diode D362.

In preferred embodiments, water-sensitive contacts 350 and 352 are made from a conductive elastomeric silicone rubber. This contact material tends not to react chemically with any minerals in the water when a DC current from battery 340 is conducted through contacts 350 and 352 as do some materials. That is, contacts 350 and 352 resist electroplating. In addition, the elastomer resists tarnishing and corrosion from exposure to the elements.

In operation, when water appears across contacts 350 and 352, the gate 358 to source 356 voltage across transistor Q346 becomes positive so that transistor Q346 is switched on and power from battery 340 appears across output terminals 336 and 338. Zener diode D362 clamps the maximum gate 358 to source 356 voltage across transistor Q346 to a maximum predetermined value to protect transistor Q346 from static discharge or overvoltage. Resistor R364 helps ensure that transistor Q346 remains off by keeping the gate 358 to source 356 voltage across transistor Q346 at substantially zero volts. Resistor R360 connects water-sensitive contact 350 to gate 358 of transistor Q346.

A filter capacitor C366 is electrically connected in parallel with output terminals 336 and 338 of circuit 300. Capacitor C366 helps remove electrical noise from the output of circuit 334.

It should be understood that the invention is not to be limited to the details above, but may be modified within the scope of the appended claims.

What is claimed is:

1. A circuit for powering at least one electroluminescent lamp through the use of a direct current voltage source, comprising:

means for converting the direct current voltage of the direct current voltage source into a sinusoidal voltage at an output of a converting means to illuminate an electroluminescent lamp electrically connected to the output, the converting means being associated with the electroluminescent lamp so that a frequency of the sinusoidal voltage is dependent, in part, upon the impedance of the lamp; and means electrically associated with the direct current voltage source and converting means for enabling the converting means so that power is periodically drawn from the direct current voltage source in pulses of predetermined duration rather than continuously.

2. The circuit of claim 1, wherein the enabling means is electrically connected in parallel to opposite polarity poles of the direct current voltage source and the converting means includes an input electrically connected in parallel to the enabling means.

3. The circuit of claim 2, wherein the enabling means includes voltage controlled switch means for electrically connecting the converting means to the direct current voltage source so that the converting means draws power from the direct current voltage source to illuminate the electroluminescent lamp and timer means for controlling a duration of the period that the voltage controlled switch means electrically connects the converting means to the direct current voltage source.

4. The circuit of claim 3, wherein the voltage controlled switch means includes a metal oxide silicon field-effect transistor having a source, a drain, and a gate, the drain being electrically connected to a pole of the direct current voltage source, the source being electrically connected to the converting means, and the gate being electrically connected to the timer means, and further wherein the timer means includes a timing capacitor and current limiting resistor, electrically connected in parallel with poles of the direct current voltage source, and a unijunction transistor having an anode electrically connected to the timing capacitor, a gate electrically connected to a voltage divider network that controls a trigger threshold of the unijunction transistor, the voltage divider network being electrically connected in parallel to the poles of the direct current voltage source, and a cathode electrically connected to the gate of the metal oxide silicon field-effect transistor and to a timing capacitor discharge resistor electrically connected to the drain of the transistor.

5. The circuit of claim 4, wherein the unijunction transistor conducts when a voltage on the timing capacitor is approximately 70% or more of the voltage of the direct current voltage source so that the metal oxide silicon field-effect transistor is enabled and electrically connects the converting means to the direct current voltage source.

6. The circuit of claim 5, wherein the timing capacitor discharge resistor controls the rate of discharge of the timing capacitor to thereby control the conduction of the unijunction transistor and the duration of the period that the converting means draws power from the direct current voltage source.

7. The circuit of claim 3, further comprising a switch electrically connected in series between a pole of the direct current voltage source and the timer means, the switch being movable between an open position where the timer means is electrically isolated from the pole of the direct current voltage source and a closed position where the timer means is electrically connected to the pole of the direct current voltage source.

8. The circuit of claim 7, further comprising means for filtering switching transients caused by moving the switch between open and closed positions to promote stabilization of the voltage supplied to the timer means by the direct current voltage source.

9. The circuit of claim 8, wherein the filtering means includes a capacitor electrically connected in parallel to the timer means.

10. In combination, a power supply and an electroluminescent lamp, said lamp being substantially capacitive, said power supply including:

a battery for providing a DC voltage;

converting means operatively associated with said battery for converting said DC voltage into a sinusoidal voltage of a predetermined frequency, said converting means including an output, said sinusoidal voltage being at said output with said DC voltage applied to said converting means;

said converting means output connected to said lamp;

said lamp being illuminated by said sinusoidal voltage when said converting means is turned on and connected to said lamp;

said capacitive lamp constituting means for adjusting the output frequency of said sinusoidal voltage as said lamp ages; and said converting means further including oscillating means for producing sinusoidal voltage pulses of predetermined duration for lengthening the life of said battery because said pulses draw less power from said battery than a continuous sinusoidal voltage of the same magnitude and frequency.

11. A circuit for powering at least one electroluminescent lamp through the use of a direct current voltage battery, comprising:

means for converting the direct current voltage of the battery into a sinusoidal voltage at an output of the converting means to illuminate an electrolumninescent lamp electrically connected to file output, the converting means being associated with the electroluminescent lamp so that a frequency of the sinusoidal voltage is dependent, in part, upon an impedance of the lamp;

means electrically associated with the battery and converting means for enabling the converting means for a predetermined period so that power is drawn from the battery in pulses of generally equal durations rather than continuously to extend the life of the battery;

wherein the enabling means is electrically connected in parallel to opposite polarity poles of the battery and the converting means includes an input electrically connected in parallel to the enabling means;

wherein the enabling means includes voltage controlled switch means for electrically connecting the converting means to the battery so that the converting means draws power from the battery to illuminate the electroluminescent lamp and timer means for controlling a duration of the period that the voltage controlled switch means electrically connects the converting means to the battery;

wherein the voltage controlled switch means includes a metal oxide silicon field-effect transistor having a source, a drain, and a gate, the drain being electrically connected to a pole of the battery, the source being electrically connected to the converting means, and the gate being electrically connected to the timer means; and wherein the timer means includes a timing capacitor and current limiting resistor, electrically connected in parallel with poles of the battery, and a unijunction transistor having an anode electrically connected to the timing capacitor, a gate electrically connected to a voltage divider network that controls a trigger threshold of the unijunction transistor, the voltage divider network being electrically connected in parallel to the poles of the battery, and a cathode electrically connected to the gate of the metal oxide silicon field-effect transistor and to a timing capacitor discharge resistor electrically connected to the drain of the transistor.

12. The circuit of claim 11, wherein the unijunction transistor conducts when a voltage on the timing capacitor is approximately 70% or more of the voltage of the battery so that the metal oxide silicon field-effect transistor is enabled and electrically connects the converting means to the battery.

13. The circuit of claim 12, wherein the timing capacitor discharge resistor controls the rate of discharge of the timing capacitor to thereby control the conduction of the unijunction transistor and the duration of the period that the converting means draws power from the battery.

14. The circuit of claim 1, wherein the direct current voltage source is a battery, and further wherein power is drawn from the battery in pulses of predetermined duration rather than continuously to extend the life of the battery.

15. The circuit of claim 1, wherein the predetermined duration ranges between approximately 10 to 15 milliseconds.

16. The circuit of claim 15, wherein the frequency of the sinusoid voltage ranges between approximately 2000 Hertz and 2,500 Hertz.

17. A circuit for powering at least one electroluminescent lamp through the use of a direct current voltage source, comprising:

an inverter converting the direct current voltage of the direct current voltage source into a sinusoidal voltage at an output of the inverter to illuminate an electroluminescent lamp electrically connected to the output, the inverter being associated with the electroluminescent lamp so that a frequency of the sinusoidal voltage is dependent, in part, upon an impedance of the lamp; and a timer, associated with the direct current voltage source and inverter, enabling the inverter so that power is periodically drawn from the direct current voltage source in pulses of predetermined duration rather than continuously.

18. The circuit of claim 17, wherein the direct current voltage source includes a battery.

19. The circuit of claim 1, wherein the electroluminescent lamp is a multi-segment electroluminescent lamp.

* * * * *

UNITED STATES PATENT AND TRADEMARK OFFICE
CERTIFICATE OF CORRECTION

PATENT NO. :   5,565,739

DATED      :   October 15, 1996

INVENTOR(S) :  Greg A. Brownell

It is certified that error appears in the above-identified patent and that said Letters Patent is hereby corrected as shown below:

The title of the invention should read --POWER SUPPLY FOR ELECTROLUMINESCENT LAMPS--.

Signed and Sealed this

Twenty-fifth Day of February, 1997

Attest:

BRUCE LEHMAN

Attesting Officer

Commissioner of Patents and Trademarks